Patented May 20, 1947

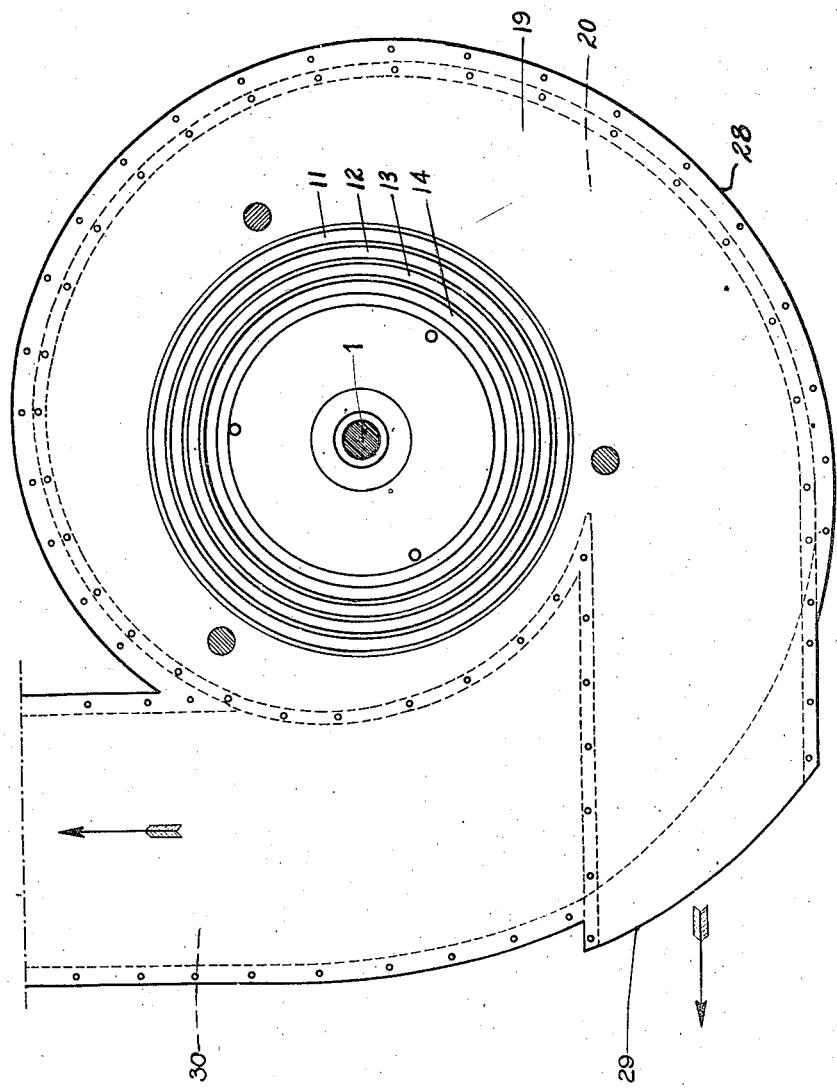

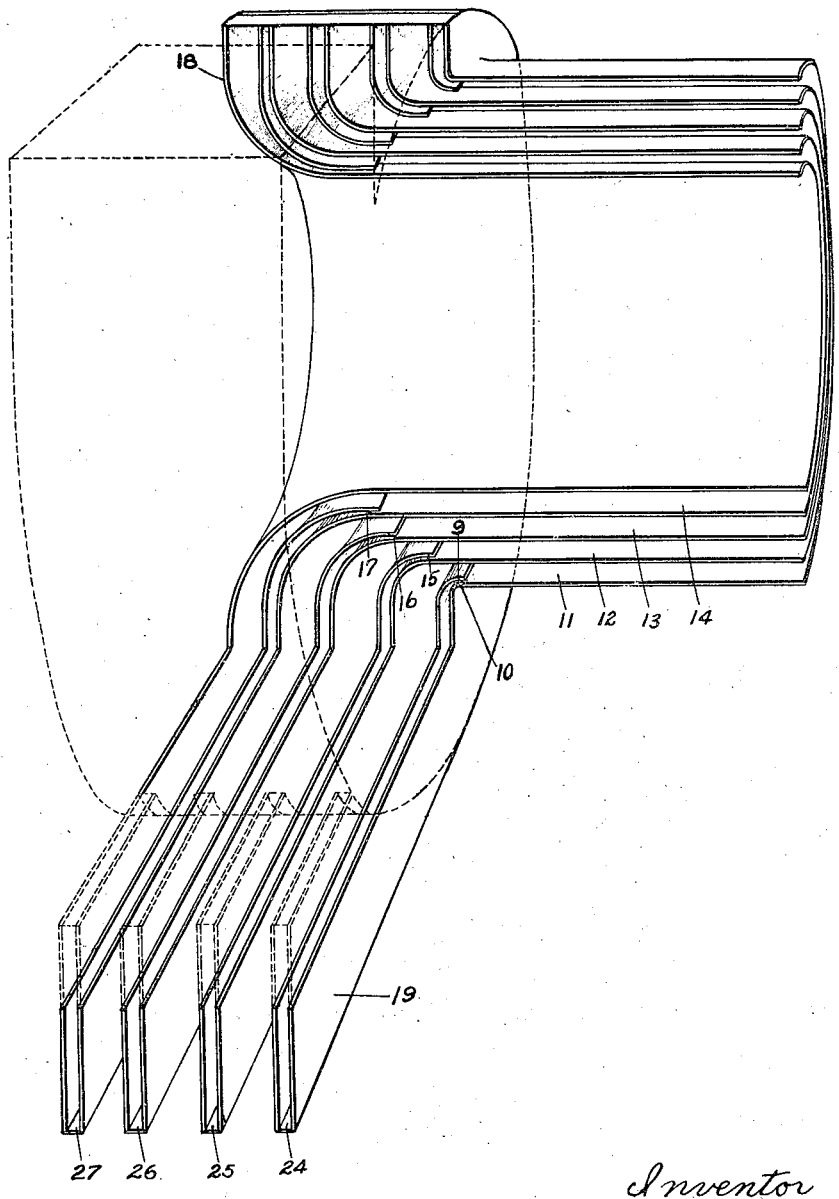

2,420,840

UNITED STATES PATENT OFFICE 2,420,840

GAS PURIFIER AND COMPRESSOR

Emile Piquerez, St. Cloud, France

Application June 28, 1945, Serial No. 602,113
In France April 26, 1944

2 Claims. (Cl. 183—77)

The object of the present invention is an apparatus for compressing gases and for simultaneously separating the solid impurities which are in suspension in these gases.

It is particularly applicable to the purification of the air for feeding internal combustion engines but it can be applied to many other uses in technics.

The apparatus according to the invention comprises a helicoidal compressor in combination with a cylindrical chamber having its axis parallel to that of the helicoid and in which the particles of dust are separated under the action of centrifugal force, means for collecting the dust arranged at the outlet of the circular chamber so as to discharge outside the dust separated by centrifugal force, and rectifying means for altering the absolute speed of the air and bringing it back into parallelism with the outlet channel axis.

In accordance with a form of embodiment, which for the moment appears preferable, collecting of the dust is effected by disposing, inside the dust removing cylindrical chamber and toward the end thereof, a concentric wall providing, between it and the wall of the chamber, an annular space through which the dust particles are drawn along by the portion of the compressed air, which escapes through this annular space.

The dust removing cylindrical chamber is connected at its outlet to a parallel faced channel in the form of a logarithmic spiral the plane of which is perpendicular to the axis of the chamber, said spiral being designed in such a manner that the speed of the air therein is tangential or substantially tangential to its external wall.

The annular orifice of the collecting device issues into a channel in the form of a spiral, similar to the preceding spiral and arranged inside the latter but designed with a polar axis offset by a suitable angle.

The two spirals are prolonged by a channel which is tangential thereto the outlet channel for the purified gas and the outlet channel for the dust particles being offset relatively to one another by a suitable angle.

Preferably, the dust separating chamber is divided into a certain number of concentric chambers by means of cylindrical partitions, each of these chambers being provided with an annular dust collecting device similar to the one described above and prolonged by a channel in the form of a spiral and a dust outlet tangential to said spiral.

The various dust collecting spirals thus constituted are enclosed inside the spiral shaped channel for the purified gas and the outlet channel of each of these dust collecting spirals passes through the external wall of the purified gas channel in order to issue into the atmosphere.

Other advantages and features of the invention will appear from the description about to be given in reference to the accompanying drawings which show, by way of example, one form of embodiment of the invention.

In the drawing:

Fig. 2 is a side view corresponding to Fig. 1, at a slightly reduced scale.

Fig. 3 is a perspective view.

Figure 1:
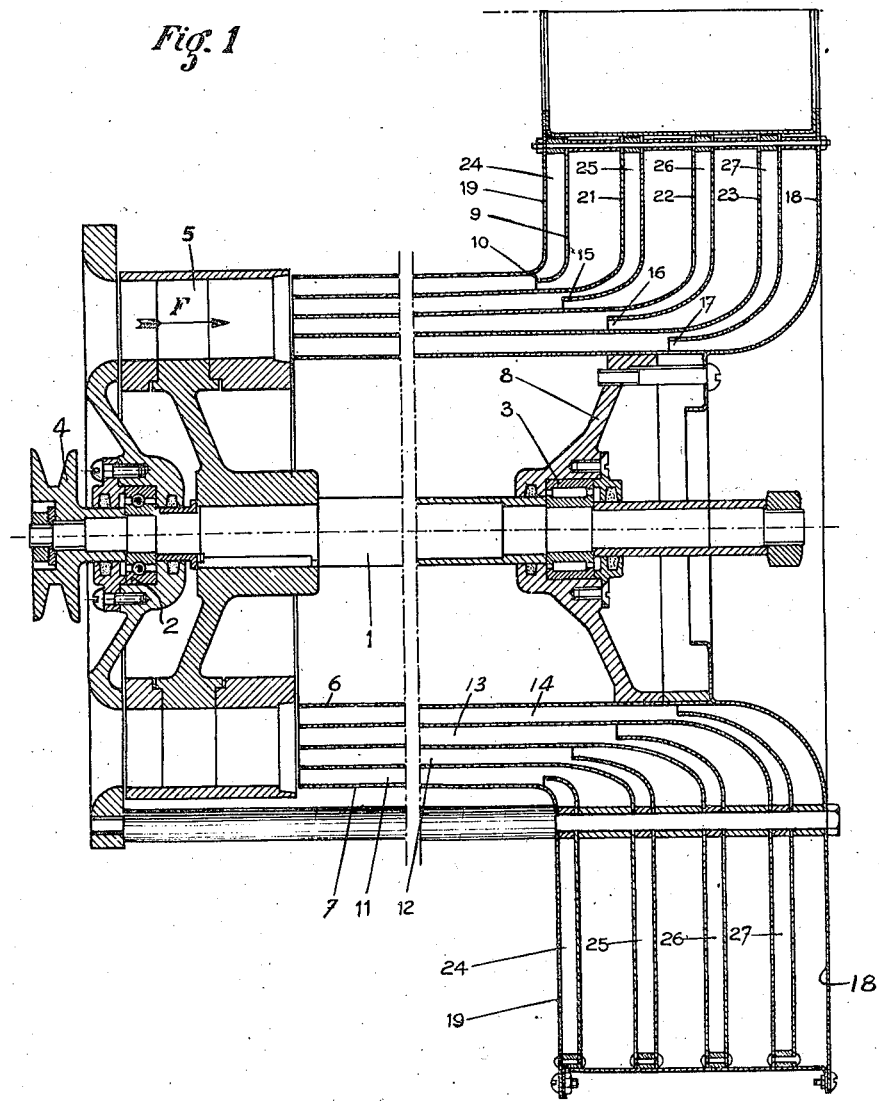
Fig. 1 is an axial section through the compressor and purifier according to the invention.

On a shaft 1 mounted on roller bearings 2 and 3 and driven at great speed, for example, by means of a transmission belt passing in the groove of a pulley 4 keyed at the end of the shaft, is mounted the chosen mechanical means for directly producing the necessary whirling motion for separating the dust particles and for imparting the desired pressure to the gases to be purified.

This mechanical means is, according to the chosen example, a helicoidal compressor 5 keyed to the shaft 1. The blades of this compressor are so designed that the absolute outlet speed has a small meridian component and a very large tangential component.

A fixed annular enclosure formed between two walls 6 and 7 is situated at the outlet of the turbine and is supported by the disc 8 in the hub of which is provided the housing for the outer ring of the roller bearing 3. The gas passing through this enclosure in the direction of the arrow F at a great tangential speed is subjected to the action of an inner centrifugal force tending to throw the dust particles in suspension toward the outer wall of the enclosure.

The thus separated dust particles are drawn along by the flow of gas towards the opposite end of the helicoid and in the neighbourhood of the wall 7. An annular collecting wall 9 is arranged at that point, at a small distance from the wall 7, forming therewith an annular space 10. The radial width of this space is so determined that all the dust particles having a diameter in excess of the smallest diameter it is proposed to separate are drawn along into the said space.

When a dust particle of the smallest diameter to be eliminated enters the annular space in the proximity of the internal wall 6, it is drawn along by the meridian speed of the gas and expelled towards the wall 7 by centrifugal action. It thus travels along a path which only brings it into contact with the wall 7 after a meridian travel which is all the longer as the dust particle is finer and less dense. The apparatus thus realized should therefore have great length if it is desired to separate fine and light particles.

In order to remove this drawback, the annular enclosure provided between the walls 6 and 7 is divided into four concentric chambers 11, 12, 13, 14, each being provided with an annular dust collecting orifice 15, 16, 17 similar to the orifice 10 described above. Thus, the radial travel which the dust particles must effect in order to reach the collecting orifices is only one quarter the distance of the walls 6 and 7 and the length of the apparatus, for obtaining the same efficiency, is very reduced.

The cylindrical walls 6 and 7 are extended at the outlet end of the gases by flat walls 18 and 19, perpendicular to the axis of the cylinders to which they are joined by toric surface portions.

These two walls 18 and 19 form the two side walls of a channel 20 (Fig. 2) outwardly limited by a wall designed in the form of a logarithmic spiral having as pole the axis of the apparatus.

The gas flowing in the chambers 11, 12, 13, 14 moves, at its outlet, at a speed having, by construction, a high tangential component and a relatively much smaller meridian component. At its inlet into the channel 20, the radial component remains unchanged whilst the meridian component is altered by reason of the toric form of the wall, and is transformed into a radial component. The two radial and tangential components are in a same plane, perpendicular to the axis of the apparatus; the resulting speed is therefore itself perpendicular to this axis. The flow becomes an equipotential plane whirl and it is known that the lines of flow of such a whirl have the form of a logarithmic spiral.

Each of the cylindrical walls limiting the chambers 11, 12, 13, 14 is, in the same manner, connected to a plane wall 21, 22, 23 and the same is true of the annular walls limiting the collecting orifices. In this manner, dust collecting chambers 24, 25, 26, 27 are provided. These chambers are limited by an outer wall in the form of a logarithmic spiral having the same pole as the spiral of wall 28, but the polar axis of which is offset by a suitable angle, for example 90°, with respect to the spiral of wall 28. Each of these chambers ends with a straight pipe connection which passes through the wall 28 and issues into the atmosphere through channels 29 which are disposed at 90° with respect to the channel 30 constituting the end of the wall 28.

The operation of the apparatus, already comprehensible from a reading of the foregoing description, is briefly as follows:

The gas to be purified enters the helicoidal compressor 5 which, as it rotates at great speed, forces it into the concentric annular chambers 11, 12, 13, 14 in a whirling movement.

Under the action of the centrifugal force produced by this whirling motion, the dust particles are, during their axial transfer from the inlet end to the outlet end inside the said chambers 11, 12, 13, 14, projected against the surfaces limiting the said chambers outwardly.

The distance comprised between the inlet of the annular enclosure formed between the walls 6 and 7, that is between the inlet of each of the annular chambers 11, 12, 13, 14 and the annular dust collecting orifices 10, 15, 16, 17 is so determined that when the flow of gas is divided at the inlet of the said orifices 10, 15, 16, 17 in order to enter the respective chambers reserved respectively to the dust particles and to the purified gas, the whole of the dust particles which it is desired to separate is applied against the surfaces limiting, outwardly, the concentric chambers 11, 12, 13, 14 respectively, in order that said particles may be driven in a positive manner into the ejecting chambers 24, 25, 26, 27.

The part of the gas flow which is completely purified continues its path, at the outlet of the spiral 28, through the channel 30 (Fig. 2).

The dust particles which collect in the spiral channels 24, 25, 26, 27 are expelled outside through the orifices 29 at the same time as the portion of gas under pressure withdrawn through the annular collecting orifices 10, 15, 16, 17.

The foregoing description is only given by way of example and to enable the principle of the invention to be better understood. It is obvious that a number of modified forms of embodiment could be realized. For example, the helicoidal compressor could be a multi-stage compressor, or be preceded by fixed directing blades. The number of purification chambers could be altered, taking into account the speed of rotation of the gas, as well as the nature and the size of the dust particles to be separated. The relative positions of the outlet channels of the purified gas and of the dust could be altered according to necessity without these alterations falling outside of the principle of the invention.

What I claim as my invention and desire to secure by Letters Patent is:

1. A gas compressor and purifier comprising a helicoidal compressor adapted to impart to the gas a tangential speed considerably in excess of the meridian speed, a chamber having a section in the shape of a circular ring, the annular space of which communicates at one of its ends with the annular outlet of the compressor, partitions dividing the said annular space of the chamber into several concentric annular spaces, several pairs of conduits of spiral shape surrounding the other end of the said chamber, the two conduits of each pair being juxtaposed and communicating with one of the said concentric annular spaces by means of orifices that are also annular, the largest being connected with the outer wall of the said space and the smallest with the inner wall of the same space, the conduit which in each pair has the orifice of the largest diameter communicating also with a space which receives the outgoing dust laden gas and the other conduit communicating with a space receiving the purified outgoing gas.

2. An apparatus according to claim 1, and in which the spiraloid conduits are connected to the concentric annular spaces by means of toric walls and the two spiraloid conduits of each pair are prolonged outwardly in different tangential directions.

EMILE PIQUEREZ.

REFERENCES CITED

The following references are of record in the file of this patent:

UNITED STATES PATENTS

| Number | Name | Date |
| --- | --- | --- |
| 1,447,554 | Jones | Mar. 6, 1923 |
| 422,943 | Hott | Mar. 11, 1890 |
| 1,824,463 | Boynton | Sept. 22, 1931 |
| 1,955,465 | Lissman | Apr. 17, 1934 |

FOREIGN PATENTS

| Number | Country | Date |
| --- | --- | --- |
| 234,509 | Germany | May 13, 1911 |